(12) United States Patent
Jang et al.

(10) Patent No.: US 11,199,492 B2
(45) Date of Patent: Dec. 14, 2021

(54) APPARATUS FOR MEASURING SPECTRUM, METHOD OF CORRECTING TEMPERATURE CHANGE OF LIGHT SOURCE IN SPECTRUM, AND APPARATUS AND METHOD FOR ESTIMATING ANALYTE CONCENTRATION

(71) Applicant: SAMSUNG ELECTRONICS CO., LTD., Suwon-si (KR)

(72) Inventors: Hyeong Seok Jang, Seoul (KR); Jae Wook Shim, Yongin-si (KR); Hyun Seok Moon, Hwaseong-si (KR); Kun Sun Eom, Yongin-si (KR); Jun Ho Lee, Incheon (KR); Myoung Hoon Jung, Bucheon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 135 days.

(21) Appl. No.: 16/682,123

(22) Filed: Nov. 13, 2019

(65) Prior Publication Data
US 2020/0158629 A1 May 21, 2020

(30) Foreign Application Priority Data
Nov. 20, 2018 (KR) .................... 10-2018-0143687

(51) Int. Cl.
*G01J 3/46* (2006.01)
*G01N 21/31* (2006.01)
*G01N 21/25* (2006.01)

(52) U.S. Cl.
CPC .......... *G01N 21/31* (2013.01); *G01N 21/255* (2013.01); *G01N 2201/1211* (2013.01)

(58) Field of Classification Search
CPC ........ G01J 3/46; G01J 3/50; G01J 3/02; G01J 3/524; G01J 3/51
(Continued)

(56) References Cited

U.S. PATENT DOCUMENTS 6,002,990 A  12/1999 Hanna
6,415,233 B1  7/2002 Haaland
(Continued)

FOREIGN PATENT DOCUMENTS

CA  2363417 A1  9/2000
EP  3326521 A1  5/2018
(Continued)

OTHER PUBLICATIONS

Communication dated Apr. 17, 2020 from the European Patent Office in application No. 19209964.6.
(Continued)

*Primary Examiner* — Md M Rahman
(74) *Attorney, Agent, or Firm* — Sughrue Mion, PLLC

(57) ABSTRACT

An apparatus for measuring a spectrum includes a light source array configured to emit light towards an object, a photodetector configured to detect light reflected by the object; and a processor configured to measure, using the light source array and the photodetector, a plurality of temperature correction spectra based on a temperature change of the light source array, obtain a light source temperature drift vector by analyzing the measured plurality of temperature correction spectra, measure, using the light source array and the photodetector, an analysis spectrum by using the light source array and the photodetector, and adjust the measured analysis spectrum to reduce an effect of the temperature change of the light source array by using the obtained light source temperature drift vector.

41 Claims, 19 Drawing Sheets

(58) Field of Classification Search
USPC .......................................................... 356/402
See application file for complete search history.

(56) References Cited

U.S. PATENT DOCUMENTS

| | | | |
|---|---|---|---|
| 6,711,503 B2 | 3/2004 | Haaland | |
| 7,133,710 B2 | 11/2006 | Acosta et al. | |
| 7,251,518 B2 | 7/2007 | Herrmann | |
| 7,268,884 B2 | 9/2007 | Kringlebotn et al. | |
| 7,299,080 B2 | 11/2007 | Acosta et al. | |
| 7,731,090 B2 | 6/2010 | Meffre | |
| 8,174,394 B2 | 5/2012 | Ridder et al. | |
| 8,873,035 B2 | 10/2014 | Yang et al. | |
| 9,687,671 B2 | 6/2017 | Weckwerth et al. | |
| 10,004,399 B2 | 6/2018 | Anikanov et al. | |
| 10,031,074 B2 | 7/2018 | Gao et al. | |
| 10,258,236 B2 | 4/2019 | Anikanov et al. | |
| 10,582,855 B2 | 3/2020 | Anikanov et al. | |
| 2005/0119541 A1 | 6/2005 | Lorenz et al. | |
| 2006/0114201 A1 | 6/2006 | Chang | |
| 2006/0167348 A1 | 7/2006 | Arnold et al. | |
| 2007/0058038 A1* | 3/2007 | David | G01S 17/18 348/135 |
| 2009/0180101 A1* | 7/2009 | Csutak | G01N 33/2823 356/70 |
| 2011/0032605 A1* | 2/2011 | Kliner | H01S 3/11 359/344 |
| 2011/0051139 A1 | 3/2011 | Mah et al. | |
| 2012/0292531 A1* | 11/2012 | Grudinin | G01N 21/65 250/459.1 |
| 2014/0201988 A1 | 7/2014 | Wang et al. | |
| 2016/0334274 A1 | 11/2016 | Xu | |
| 2017/0049332 A1 | 2/2017 | Park et al. | |
| 2017/0059477 A1 | 3/2017 | Feitisch et al. | |
| 2017/0336257 A1 | 11/2017 | Frank et al. | |
| 2018/0020956 A1* | 1/2018 | Lee | A61B 5/7278 600/306 |
| 2018/0042557 A1 | 2/2018 | Park et al. | |
| 2018/0064378 A1 | 3/2018 | Park et al. | |
| 2018/0146899 A1 | 5/2018 | Lee et al. | |
| 2019/0302083 A1* | 10/2019 | Lalovic | G01J 3/04 |

FOREIGN PATENT DOCUMENTS

| | | | |
|---|---|---|---|
| KR | 10-2005-0054730 A | | 6/2005 |
| KR | 10-2018-0061959 A | | 6/2018 |

OTHER PUBLICATIONS

Delbeck, S., et al., "Non-invasive monitoring of blood glucose using optical methods for skin spectroscopy—opportunities and recent advance", Analytical and Bioanalytical Chemistry (2019), vol. 411, No. 1, Published Online Oct. 3, 2018, pp. 63-77.

Goodarzi, M., et al., "Multivariate calibration of NIR spectroscopic sensors for continuous glucose monitoring", Trends in Analytical Chemistry, vol. 67, 2015, pp. 147-158.

Gujral, P., et al., "Framework for explicit drift correction in multivariate calibration models", Journal of Chemometrics, vol. 24, No. 7-8, 2010, pp. 534-543.

* cited by examiner

APPARATUS FOR MEASURING SPECTRUM, METHOD OF CORRECTING TEMPERATURE CHANGE OF LIGHT SOURCE IN SPECTRUM, AND APPARATUS AND METHOD FOR ESTIMATING ANALYTE CONCENTRATION

CROSS-REFERENCE TO RELATED APPLICATION(S)

This application is based on and claims priority under 35 U.S.C. § 119 to Korean Patent Application No. 10-2018-0143687, filed on Nov. 20, 2018, in the Korean Intellectual Property Office, the disclosure of which is incorporated by reference herein in its entirety.

BACKGROUND

1. Field

The disclosure relates to an apparatus for measuring a spectrum, and an apparatus and method for estimating an analyte concentration.

2. Description of Related Art

Diabetes is a chronic disease that causes various complications and can be difficult to manage. Accordingly, people with diabetes are advised to check their blood glucose regularly to prevent complications. In particular, when insulin is administered to control blood glucose levels, the blood glucose levels should be closely monitored to avoid hypoglycemia and control insulin dosage. An invasive method of finger pricking is generally used to measure blood glucose levels. However, while the invasive method may provide high reliability in measurement, it may cause pain and inconvenience as well as an increased risk of disease and infection due to the use of injection. Recently, research has been conducted regarding a method of non-invasively measuring blood glucose accurately by using a spectrometer without blood sampling.

SUMMARY

Provided are an apparatus for measuring a spectrum, a method of correcting a temperature change of a light source in a spectrum, and an apparatus and method for estimating a concentration of an analyte.

In accordance with an aspect of the disclosure, an apparatus for measuring a spectrum may include a light source array configured to emit light towards an object, a photodetector configured to detect light reflected by the object; and a processor configured to measure, using the light source array and the photodetector, a plurality of temperature correction spectra based on a temperature change of the light source array, obtain a light source temperature drift vector by analyzing the measured plurality of temperature correction spectra, measure, using the light source array and the photodetector, an analysis spectrum by using the light source array and the photodetector, and adjust the measured analysis spectrum to reduce an effect of the temperature change of the light source array by using the obtained light source temperature drift vector.

The processor may measure a first temperature correction spectrum by driving the light source array based on a first driving condition, induce the temperature change of the light source array by changing the first driving condition to a second driving condition, and measure a second temperature correction spectrum by driving the light source array based on the second driving condition.

The processor may induce the temperature change of the light source array by changing at least one of a pulse width, a cooling delay, and an intensity of an applied current.

The processor may calculate a difference spectrum between the first temperature correction spectrum and the second temperature correction spectrum, and extract a principal component spectrum vector of the calculated difference spectrum as the light source temperature drift vector.

The processor may extract the principal component spectrum vector by using one of Principal Component Analysis (PCA), Independent Component Analysis (ICA), Non-negative Matrix Factorization (NMF), and Singular Value Decomposition (SVD).

The processor may obtain a light source temperature drift vector component from the measured analysis spectrum by regression analysis using the obtained light source temperature drift vector, and remove the obtained light source temperature drift vector component from the measured analysis spectrum.

The processor may correct a slope and an offset in the measured analysis spectrum.

The plurality of temperature correction spectra and the analysis spectrum may be absorption spectra.

The apparatus for measuring a spectrum may include a reference photodetector configured to detect light emitted by the light source array.

The processor may determine whether a driving condition change is effectively applied based on an intensity of the light detected by the reference photodetector.

In accordance with an aspect of the disclosure, a method of correcting a temperature change of a light source in a spectrum may include measuring a plurality of temperature correction spectra of an object based on a temperature change of a light source, obtaining a light source temperature drift vector by analyzing the measured plurality of temperature correction spectra, measuring an analysis spectrum of the object, and adjusting the measured analysis spectrum to reduce an effect of the temperature change of the light source by using the obtained light source temperature drift vector.

The measuring of the plurality of temperature correction spectra may include measuring a first temperature correction spectrum by driving the light source based on a first driving condition, inducing the temperature change of the light source by changing the first driving condition to a second driving condition, and measuring a second temperature correction spectrum by driving the light source based on the second driving condition.

The inducing of the temperature change of the light source may include inducing the temperature change of the light source by changing at least one of a pulse width, a cooling delay, and an intensity of an applied current.

The obtaining of the light source temperature drift vector may include calculating a difference spectrum between the first temperature correction spectrum and the second temperature correction spectrum, and extracting a principal component spectrum vector of the calculated difference spectrum as the light source temperature drift vector.

The extracting of the principal component spectrum vector may include extracting the principal component spectrum vector by using one of Principal Component Analysis (PCA), Independent Component Analysis (ICA), Non-negative Matrix Factorization (NMF), and Singular Value Decomposition (SVD).

The adjusting of the measured analysis spectrum to reduce the effect of the temperature change of the light source may include obtaining a light source temperature drift vector component from the measured analysis spectrum by regression analysis using the obtained light source temperature drift vector, and removing the obtained light source temperature drift vector component from the analysis spectrum.

The method may include correcting a slope and an offset in the measured analysis spectrum.

The plurality of temperature correction spectra and the analysis spectrum may be absorption spectra.

The method of correcting a temperature change of a light source in a spectrum may further include receiving a light signal emitted by the light source.

The method of correcting a temperature change of a light source in a spectrum may further include determining whether a driving condition change is effectively applied based on an intensity of the detected light.

In accordance with an aspect of the disclosure, an apparatus for estimating a concentration of an analyte may include a light source array configured to emit light towards an object, a photodetector configured to detect light reflected by the object, and a processor configured to measure, using the light source array and the photodetector, a plurality of temperature correction spectra based on a temperature change of the light source array, obtain a light source temperature drift vector by analyzing the measured plurality of temperature correction spectra, update a concentration estimation model by using the obtained light source temperature drift vector, measure, using the light source array and the photodetector, an analysis spectrum, and estimate the concentration of the analyte by using the updated concentration estimation model and the measured analysis spectrum.

The processor may measure a first temperature correction spectrum by driving the light source array based on a first driving condition, induce a temperature change of the light source array by changing the first driving condition to a second driving condition, and measure a second temperature correction spectrum by driving the light source array based on the second driving condition.

The processor may induce the temperature change of the light source array by changing at least one of a pulse width, a cooling delay, and an intensity of an applied current.

The processor may calculate a difference spectrum between the first temperature correction spectrum and the second temperature correction spectrum, and extract a principal component spectrum vector of the calculated difference spectrum as the light source temperature drift vector.

The processor may extract the principal component spectrum vector by using one of Principal Component Analysis (PCA), Independent Component Analysis (ICA), Non-negative Matrix Factorization (NMF), and Singular Value Decomposition (SVD).

The analyte may be at least one of glucose, triglyceride, urea, uric acid, lactate, protein, cholesterol, or ethanol.

The concentration estimation model may be generated using a Net Analyte Signal (NAS) algorithm.

The processor may measure a plurality of training spectra in a predetermined interval by using the light source array and the photodetector, and generate the concentration estimation model based on the measured plurality of training spectra.

The processor may extract a principal component spectrum vector from the measured plurality of training spectra, and generate the concentration estimation model based on the extracted principal component spectrum vector and a pure component spectrum vector of the analyte.

The predetermined interval may be an interval in which the concentration of the analyte of the object is substantially constant.

The analyte may be glucose; and the interval, in which the concentration of the analyte of the object is substantially constant, may be a fasting interval.

In accordance with an aspect of the disclosure, a method of estimating a concentration of an analyte includes measuring a plurality of temperature correction spectra of an object based on a temperature change of a light source, obtaining a light source temperature drift vector by analyzing the measured plurality of temperature correction spectra, updating a concentration estimation model by using the obtained light source temperature drift vector, measuring an analysis spectrum of the object, and estimating the concentration of the analyte by using the updated concentration estimation model and the measured analysis spectrum.

The measuring of the plurality of temperature correction spectra includes measuring a first temperature correction spectrum by driving the light source based on a first driving condition, inducing a temperature change of the light source by changing the first driving condition to a second driving condition, and measuring a second temperature correction spectrum by driving the light source based on the second driving condition.

The inducing of the temperature change of the light source may include inducing the temperature change of the light source by changing at least one of a pulse width, a cooling delay, and an intensity of an applied current.

The obtaining of the light source temperature drift vector may include calculating a difference spectrum between the first temperature correction spectrum and the second temperature correction spectrum, and extracting a principal component spectrum vector of the calculated difference spectrum as the light source temperature drift vector.

The extracting of the principal component spectrum vector may include extracting the principal component spectrum vector by using one of Principal Component Analysis (PCA), Independent Component Analysis (ICA), Non-negative Matrix Factorization (NMF), and Singular Value Decomposition (SVD).

The analyte may be at least one of glucose, triglyceride, urea, uric acid, lactate, protein, cholesterol, or ethanol.

The concentration estimation model may be generated using a Net Analyte Signal (NAS) algorithm.

The method of estimating a concentration may further include measuring a plurality of training spectra in a predetermined interval by using the light source and a photodetector, and generating the concentration estimation model based on the measured plurality of training spectra.

The generating of the concentration estimation model may include extracting a principal component spectrum vector from the measured plurality of training spectra, and generating the concentration estimation model based on the extracted principal component spectrum vector and a pure component spectrum vector of the analyte.

The predetermined interval may be an interval in which the concentration of the analyte of the object is substantially constant.

The analyte may be glucose; and the interval, in which the concentration of the analyte of the object is substantially constant, is a fasting interval.

BRIEF DESCRIPTION OF THE DRAWINGS

Throughout the drawings and the detailed description, unless otherwise described, the same drawing reference numerals may refer to the same elements, features, and structures. The relative size and depiction of these elements may be exaggerated for clarity, illustration, and convenience.

DETAILED DESCRIPTION

Hereinafter, embodiments of the present disclosure will be described in detail with reference to the accompanying drawings. It should be noted that wherever possible, the same reference symbols may refer to the same elements, features, structures, etc. In the following description, a detailed description of known functions and configurations incorporated herein may be omitted so as to not obscure the subject matter of the present disclosure.

Process steps described herein may be performed differently from a specified order. That is, each step may be performed in a specified order, at substantially simultaneously, in a reverse order, or in a different order.

Further, the terms used throughout the specification may be defined in consideration of the functions according to exemplary embodiments, and can be varied according to a purpose of a user or manager, precedent, etc. Therefore, definitions of the terms should be made on the basis of the overall context of the disclosure.

It will be understood that, although terms such as "first," "second," etc. may be used herein to describe various elements, these elements might not be limited by these terms. These terms may be used to distinguish one element from another. The singular form of terms may include the plural form of the term unless expressly stated otherwise. In the present disclosure, it should be understood that the terms, such as "including," "having," etc., may indicate the existence of the features, numbers, steps, actions, components, parts, or combinations thereof disclosed in the specification, and might not preclude the possibility that one or more other features, numbers, steps, actions, components, parts, or combinations thereof may exist or may be added.

Further, components described in the specification are discriminated according to functions mainly performed by the components. That is, two or more components may be integrated into a single component. Furthermore, a single component may be separated into two or more components. Moreover, each component may additionally perform some or all of a function executed by another component in addition to the main function thereof. Some or all of the main function of each component ay be carried out by another component.

Figure 1:
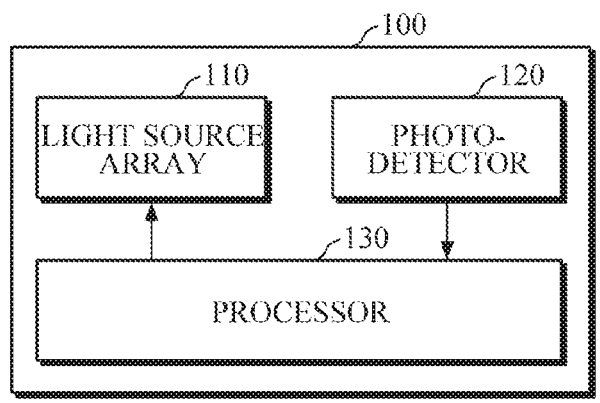
FIG. 1 is a diagram illustrating an example of an apparatus for measuring a spectrum according to an embodiment.

FIG. 1 is a diagram illustrating an example of an apparatus for measuring a spectrum according to an embodiment. The spectrum measuring apparatus 100 of FIG. 1 is an apparatus for measuring an in vivo spectrum of an object, and correcting an effect of a temperature change of a light source on the measured in vivo spectrum, and may be embedded in an electronic device or may be enclosed in a housing to be provided as a separate device. In this case, examples of the electronic device may include a cellular phone, a smartphone, a tablet personal computer (PC), a laptop computer, a personal digital assistant (PDA), a portable multimedia player (PMP), a navigation device, an MP3 player, a digital camera, a wearable device, and the like; and examples of the wearable device may include a wristwatch-type wearable device, a wristband-type wearable device, a ring-type wearable device, a waist belt-type wearable device, a necklace-type wearable device, an ankle band-type wearable device, a thigh band-type wearable device, a forearm band-type wearable device, and the like. However, the electronic device is not limited to the above examples, and the wearable device is neither limited thereto.

Referring to FIG. 1, the spectrum measuring apparatus 100 includes a light source array 110, a photodetector 120, and a processor 130.

The light source array 110 may include a plurality of light sources which emit light of different wavelengths towards an object. In an embodiment, each light source may emit light of a predetermined wavelength (e.g., near-infrared (NIR) light, mid-infrared (MIR) light, and the like) towards the object. However, wavelengths of light to be emitted by each light source may vary according to a purpose of measurement or the type of an analyte. Further, each light source may be a single light-emitting body, or may be formed as an array of a plurality of light-emitting bodies. In an embodiment, each light source may include a light emitting diode (LED), a laser diode, a fluorescent body, and the like.

The photodetector 120 may receive a light signal which is reflected by an object, scattered by the object, or transmitted towards the object. The photodetector 120 may convert the received light signal into an electrical signal, and may transmit the electrical signal to the processor 130. In an embodiment, the photodetector 120 may include a photo diode (PD), a photo transistor (PTr), a charge-coupled device (CCD), and the like. The photodetector 120 may be a single device, or may be formed as an array of a plurality of devices.

There may be various numbers and arrangements of the light sources and the photodetector, and the number and arrangement thereof may vary according to a type and a purpose of use of an analyte, the size and shape of the electronic device in which the spectrum measuring apparatus 100 is mounted, and the like. In addition, the spectrum measuring apparatus 100 may further dude various optical elements (e.g., a filter, a mirror, a lens, etc.).

The processor 130 may process various signals and perform operations associated with measuring an in vivo spectrum, correcting an effect of a temperature change of the light source, and the like.

The processor 130 may measure the in vivo spectrum of the object by reconstructing a spectrum based on an intensity of light received by the photodetector 120. Here, the in vivo spectrum may be an absorption spectrum, but is not limited thereto, and may be a reflection spectrum or a transmission spectrum.

The method of reconstructing a spectrum by the processor 130 will be described in more detail with reference to FIGS. 3A to 3C.

By using the light source array 110 and the photodetector 120, the processor 130 may measure a plurality of in vivo spectra based on a temperature change of each light source of the light source array 110 (hereinafter referred to as a "temperature correction spectrum"). Further, the processor 130 may measure an in vivo spectrum for analysis (hereinafter referred to as an "analysis spectrum").

The processor 130 may induce a temperature change of each light source of the light source array 110 by changing driving conditions of the light source array 110. In this case, the driving conditions to be changed may include at least one of an intensity of an applied current, a pulse width, and a cooling delay. Further, the processor 130 may measure a plurality of temperature correction spectra by measuring the in vivo spectra of the object while changing the driving conditions of the light source array 110. In an embodiment, the processor 130 may measure a first temperature correction spectrum by driving the light source array 110 based on a first driving condition; and may induce a temperature change of the light source array 110 by changing the first driving condition to a second driving condition, and may measure a second temperature correction spectrum by driving the light source array 110 based on the second driving condition. Further, the processor 130 may measure a plurality of first temperature correction spectra, and a plurality of second temperature correction spectra by repeatedly changing the driving conditions during a predetermined period of time. In this case, the predetermined period of time may be 20 seconds, but this is merely an example, and the predetermined period of time is not limited thereto and may be set to various values.

In an embodiment, the processor 130 may measure a plurality of temperature correction spectra by changing a cooling delay of the light source array 110. For example, the processor 130 may measure a first temperature correction spectrum by driving each light source of the light source array 110 based on a first cooling delay. Further, upon completing measurement of the first temperature correction spectrum, the processor 130 may change the first cooling delay to a second cooling delay; and based on the cooling delay being changed to the second cooling delay, the processor 130 may drive each light source of the light source array 110 based on the second cooling delay, to measure a second temperature correction spectrum. In addition, based on completing measurement of the second temperature correction spectrum, the processor 130 may change the second cooling delay to the first cooling delay; and based on the cooling delay being changed to the first cooling delay, the processor 130 may drive each light source of the light source array 110 based on the first cooling delay, to measure the first temperature correction spectrum. By repeatedly changing the cooling delay of each light source, from the first cooling delay to the second cooling delay and from the second cooling delay to the first cooling delay, during a predetermined period of time, the processor 130 may measure the plurality of first temperature correction spectra and the plurality of second temperature correction spectra.

In another example, the processor 130 may measure a plurality of temperature correction spectra by changing a pulse width of the light source array 110. For example, the processor 130 may measure a first temperature correction spectrum by driving each light source of the light source array 110 based on a first pulse width. Further, based on completing measurement of the first temperature correction spectrum, the processor 130 may change the first pulse width to a second pulse width; and based on the first pulse width being changed to the second pulse width, the processor 130 may drive each light source based on the second pulse width, to measure a second temperature correction spectrum. In addition, based on completing measurement of the second temperature correction spectrum, the processor 130 may change the second pulse width to the first pulse width; and based on the second pulse width being changed to the first pulse width, the processor 130 may drive each light source with the first pulse width, to measure the first temperature correction spectrum. By repeatedly changing the pulse width of each light source, from the first pulse width to the second pulse width and from the second pulse width to the first pulse width, during a predetermined period of time, the processor 130 may measure the plurality of first temperature correction spectra and the plurality of second temperature correction spectra.

In yet another example, be processor 130 may measure a plurality of temperature correction spectra by changing an intensity of an applied current of the light source array 110. For example, the processor 130 may measure a first temperature correction spectrum by applying a current having a first intensity to each light source of the light source array 110. Further, based on completing measurement of the first temperature correction spectrum, the processor 130 may change the first intensity of the applied current to a second intensity; and based on the intensity of the applied current being changed from the first intensity to the second intensity, the processor 130 may measure a second temperature correction spectrum by applying a current having the second intensity to each light source of the light source array 110. In addition, based on completing measurement of the second temperature correction spectrum, the processor 130 may change the second intensity of the applied current to the first intensity; and based on the intensity of the applied current being changed from the second intensity to the first intensity, the processor 130 may measure the first temperature correction spectrum by applying the current having the first intensity to each light source of the light source array 110. By repeatedly changing the intensity of the applied current, from the first intensity to the second intensity and from the second intensity to the first intensity, during a predetermined period of time, the processor 130 may measure the plurality of first temperature correction spectra and the plurality of second temperature correction spectra.

In still another example, the processor 130 may measure a plurality of temperature correction spectra by changing two or more of the cooling delay, the pulse width, and the intensity of the applied current of the light source array 110.

Further, in the case where the processor 130 measures the plurality of temperature correction spectra by changing the pulse width and/or the intensity of the applied current of the light source array 110, a change in temperature of the light source array 110, a change in the pulse width, and/or a change in the intensity of the applied current may all affect the temperature correction spectra. In this case, the processor 130 may perform preprocessing to reduce the effect of the change in the pulse width and/or the effect of the change in the intensity of the applied current from the measured temperature correction spectrum. Information associated with the effect of the change in the pulse width and/or the effect of the change in the intensity of the applied current may be pre-stored in an internal or external memory of the processor 130.

The processor 130 may obtain a light source temperature drift vector by analyzing the measured plurality of temperature correction spectra. In an embodiment, the processor 130 may calculate a difference spectrum between the first temperature correction spectrum, measured in association with the first driving condition, and the second temperature correction spectrum measured in association with the second driving condition; and may extract a principal component spectrum vector of the calculated difference spectrum as the light source temperature drift vector. In this case, the processor 130 may extract the principal component spectrum vector from the difference spectrum by using various dimension reduction algorithms such as Principal Component Analysis (PCA), Independent Component Analysis (ICA), Non-negative Matrix Factorization (NMF), Singular Value Decomposition (SVD), and the like. In an embodiment, the processor 130 may preprocess the difference spectrum by using various preprocessing methods such as multiplicative scatter correction (MSC), Standard normal variate (SNV), Orthogonal Signal Correction (OSC), Savitzky-Golay (SG), and the like.

By using the obtained light source temperature drift vector, the processor 130 may reduce the effect of the temperature change of the light source array 110 from the analysis spectrum. The processor 130 may adjust an analysis spectrum based on the light source temperature drift vector. For example, the processor 130 may obtain a light source temperature drift vector component from the analysis spectrum by regression analysis, educe the effect of the temperature change of the light source array 110 from the analysis spectrum by removing the obtained light source temperature drift vector component from the analysis spectrum.

In an embodiment, the processor 130 may correct a slope and an offset in the analysis spectrum. For example, the processor 130 may correct the slope and the offset in the analysis spectrum by MIN-MAX normalization, multiplicative scatter correction (MSC), and the like.

When a predetermined period of time elapses after obtaining the light source temperature drift vector, the processor 130 may re-measure a plurality of temperature correction spectra, and may re-obtain a light source temperature drift vector based on the re-measured plurality of temperature correction spectra. That is, by periodically updating the light source temperature drift vector, the processor 130 may properly reflect a change in optical characteristics (e.g., scattering coefficient) of an object.

Figure 2:
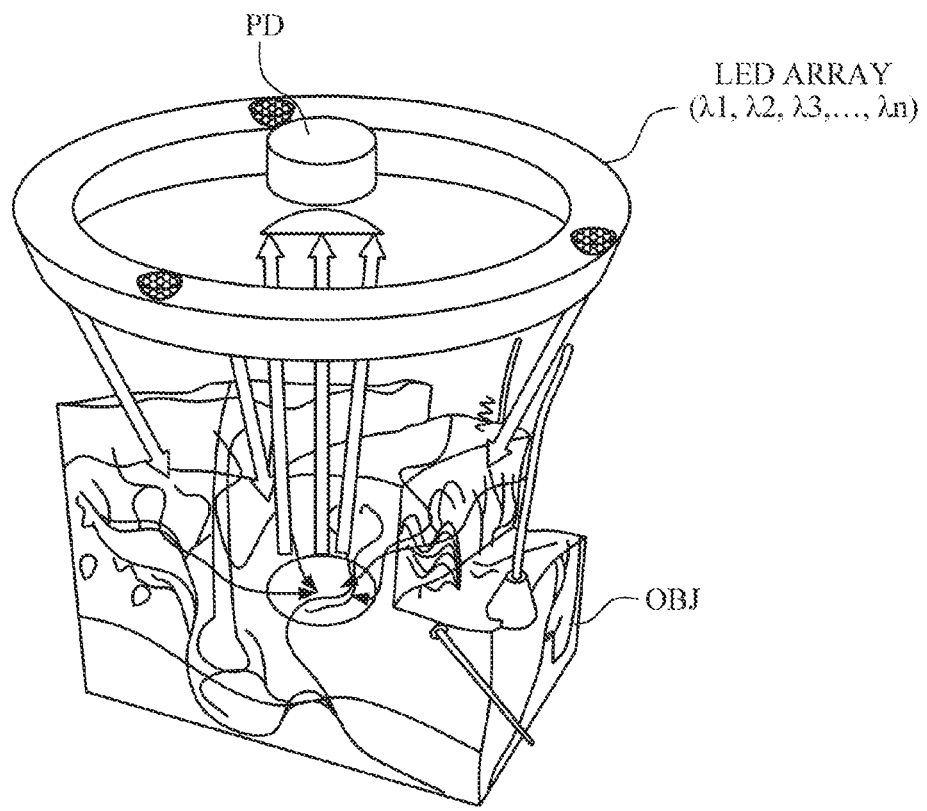
FIG. 2 is a diagram illustrating an example of an LED-PD structure according to an embodiment.

FIG. 2 is a diagram illustrating an example of an LED-PD structure according to an embodiment. The LED-PD structure of FIG. 2 may be an example of a structure of the light source array 110 and the photodetector 120 of FIG. 1.

Referring to FIG. 2, the LED-PD structure may be formed with an LED array of n number of LEDs and a photo diode (PD). The LED array may be disposed outside of the photo diode (PD) to surround the photo diode (PD). For example, the LED array may be arranged in a concentric circle around the photo diode (PD).

The LEDs may be configured to emit light of predetermined and different peak wavelengths $\lambda_1$, $\lambda_2$, $\lambda_3$, and $\lambda_n$, respectively. The LEDs may be driven sequentially according to a predetermined control signal to emit light of a predetermined peak wavelength towards an object OBJ; and the photo diode (PD) may detect light reflected by the object OBJ.

Figure 3:
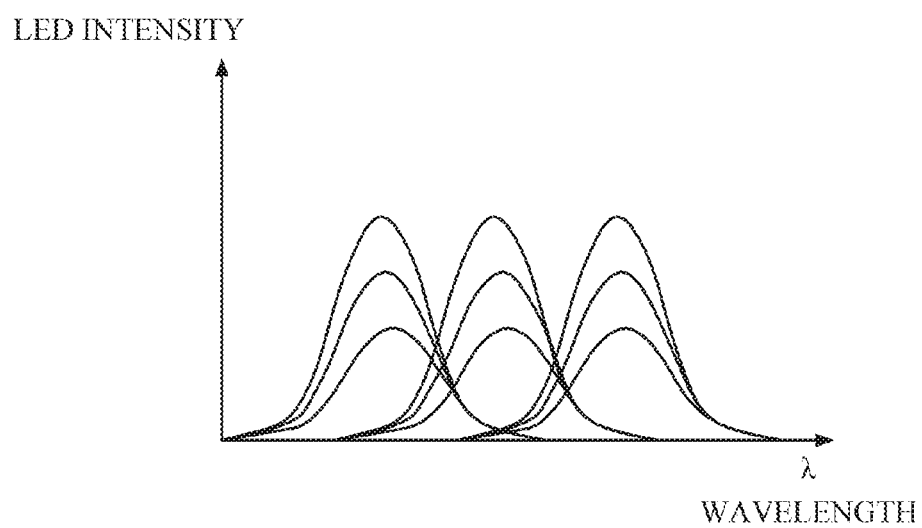
FIGS. 3 to 5 are diagrams explaining an example of reconstructing a spectrum by a processor according to an embodiment.
Figure 4:
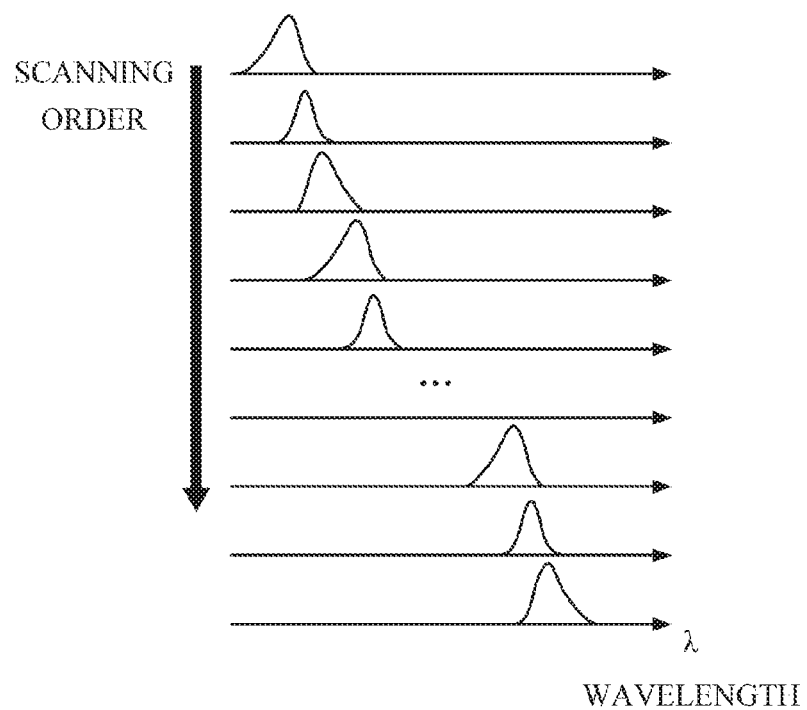
Figure 5:
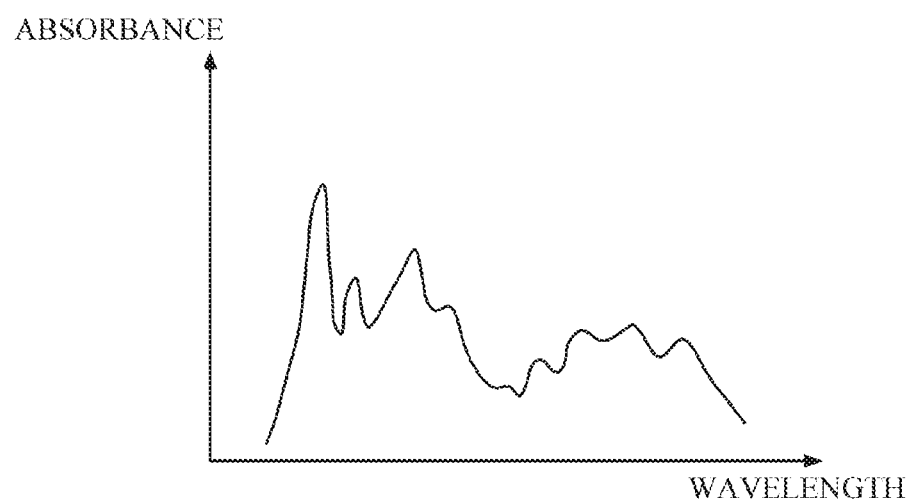

FIGS. 3 to 5 are diagrams explaining an example of reconstructing a spectrum by a processor according to an embodiment.

Referring to FIGS. 2 and 3, the light source array 110 is composed of an LED array having n number of LEDs; and the LEDs may be configured to emit light of predetermined peak wavelengths $\lambda_1, \lambda_2, \lambda_3, \ldots,$ and $\lambda_n$, respectively, based on light source driving conditions (e.g., an intensity of an applied current, a pulse width, a cooling delay, etc.).

Referring to FIG. 4, the processor 130 may sequentially drive each light source based on a predetermined driving sequence, light source driving conditions, and the like, to emit light; and the photodetector (PD) may detect light reflected by the object OBJ. In this case, the processor 130 may drive a subset of the light sources, and may divide the light sources into groups to drive each group of the light sources in a time-division manner.

Referring to FIG. 5, the processor 130 may reconstruct a spectrum by receiving the light signal detected by the photodetector (PD).

$$y_\alpha = (\alpha E + A^T A)^{-1} A^T p \quad \text{[Equation 1]:}$$

Referring to Equation 1 above, α denotes a parameter for spectrum reconstruction, E denotes a unit matrix, A denotes a light source spectrum measured for each light source according to driving conditions, p denotes the intensity of the light signal detected by the photodetector, and $y_\alpha$ denotes the reconstructed spectrum. In this case, the light source spectrum may refer to a spectrum of light emitted by each light source, and information associated with the light source spectrum may be pre-stored in an internal or an external database.

Figure 6:
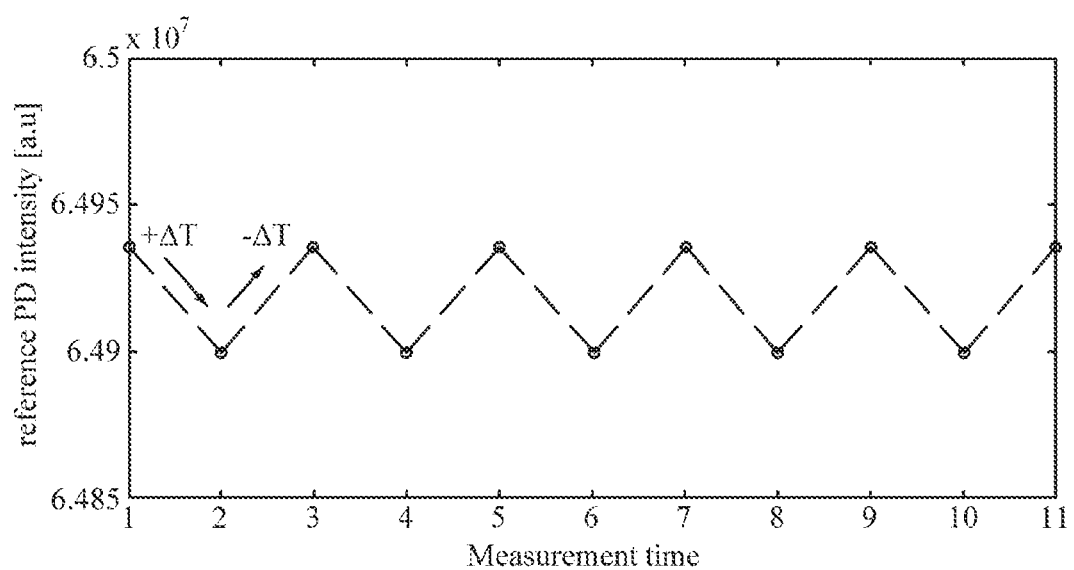
FIGS. 6 to 9 are exemplary diagrams explaining an example of obtaining a light source temperature drift vector according to an embodiment.
Figure 7:
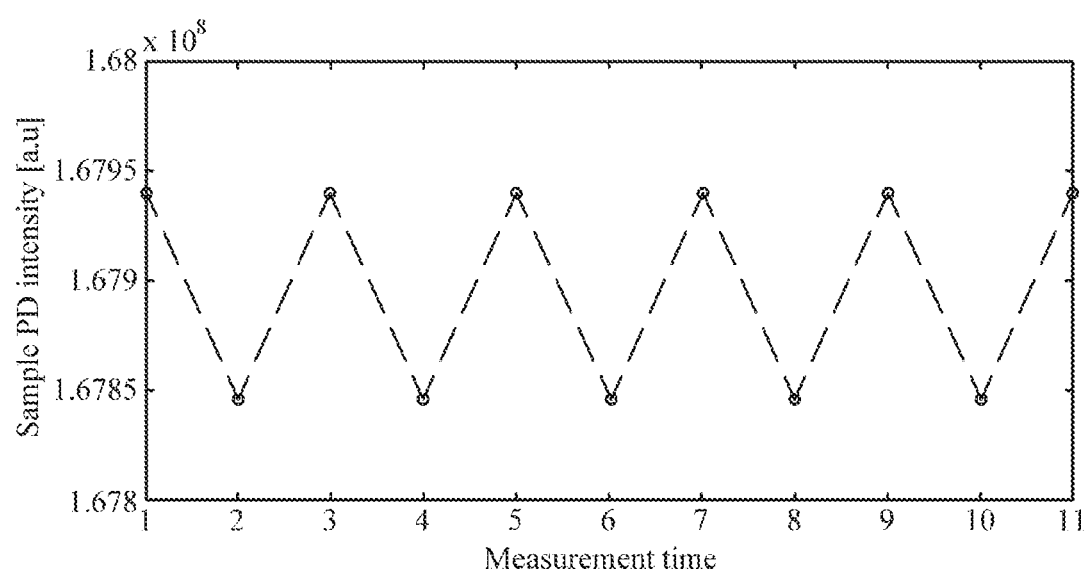
Figure 8:
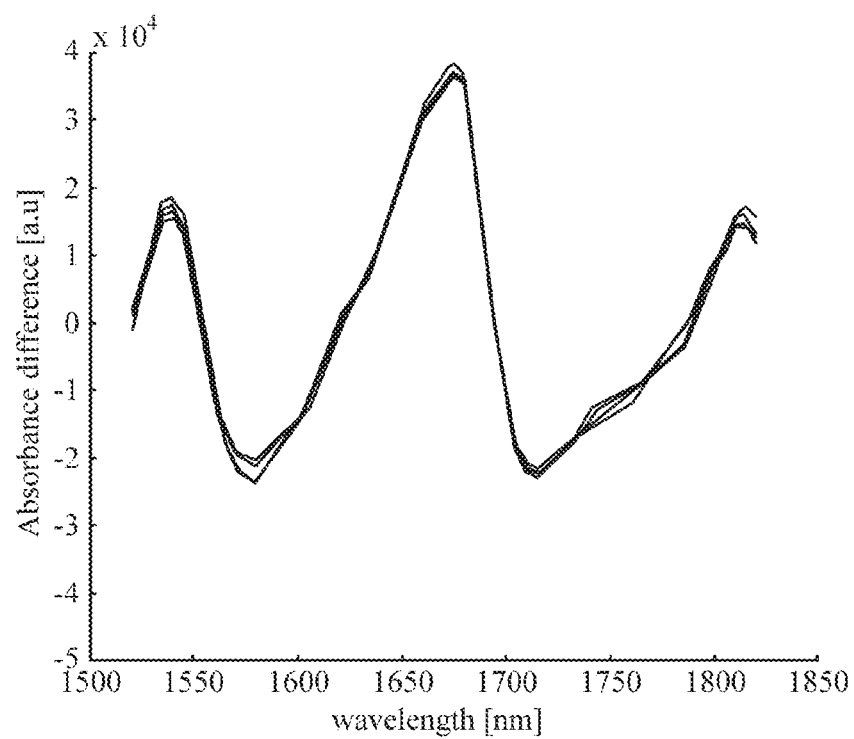
Figure 9:
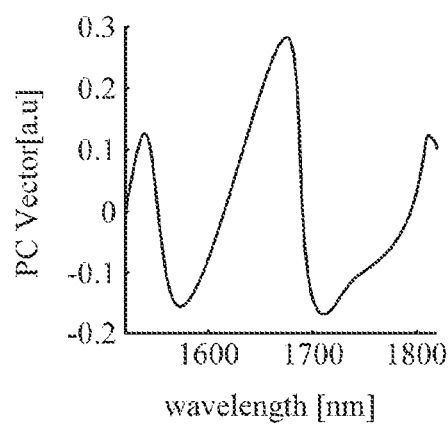

FIGS. 6 to 9 are exemplary diagrams explaining an example of obtaining a light source temperature drift vector according to an embodiment. More specifically, FIG. 6 is an exemplary diagram illustrating an intensity of a light signal emitted by a light source based on a change in driving conditions according to an embodiment; FIG. 7 is an exemplary diagram illustrating an intensity of a light signal reflected by an object based on light being emitted with the intensity of FIG. 6 towards the object according to an embodiment; FIG. 8 is an exemplary diagram illustrating a difference spectrum between a first temperature correction spectrum and a second temperature correction spectrum which are measured by changing driving conditions according to an embodiment; and FIG. 9 is an exemplary diagram illustrating a light source temperature drift vector which is extracted from the difference spectrum of FIG. 8 according to an embodiment.

Referring to FIGS. 6 and 7, the processor 130 may measure a first temperature correction spectrum by driving the light source array 110 with a 1000 microsecond (μs) cooling delay at a measurement time 1. Based on completing measurement of the first temperature correction spectrum, the processor 130 may change the cooling delay from 1000 μs to 100 μs; and at a measurement time 2 after the 100 μs cooling delay, the processor 130 may drive the light source array 110 to measure a second temperature correction spectrum. In this case, temperature of the light source array 110 at the measurement time 2 is increased by ΔT as compared to temperature of the light source at the measurement time 1. Based on completing measurement of the second temperature correction spectrum, the processor 130 may change the cooling delay from 100 μs to 1000 μs; and at a measurement time 3 after the 1000 μs cooling delay, the processor 130 may drive the light source array 110 to measure the first temperature correction spectrum. In this case, temperature of the light source array 110 at the measurement time 3 is decreased by ΔT as compared to the temperature of the light source array 110 at the measurement time 2. In this manner, by repeatedly changing the cooling delay during a predetermined period time, the processor 130 may measure a plurality of first temperature correction spectra and a plurality of the second temperature correction spectra.

An example of the intensity of the light signal emitted by the light source array 110 based on the cooling delay being repeatedly changed is illustrated in FIG. 6; and an example of the intensity of the light signal reflected by the object at that time is illustrated in FIG. 7. As illustrated in FIGS. 6 and 7, it can be seen that as the cooling delay is repeatedly changed, the intensity of the light signal and the intensity of light reflected by the sample at that time are changed.

Referring to FIG. 8, the processor 130 may calculate the difference spectrum by subtracting the second temperature correction spectrum from the first temperature correction spectrum. In this case, if the temperature of the light source array 110 is decreased by ΔT, the difference spectrum may indicate a change in the spectrum of the sample.

While FIG. 8 illustrates an example of the difference spectrum calculated by subtracting the second temperature correction spectrum from the first temperature correction spectrum, the difference spectrum is not limited thereto. That is, in contrast with FIG. 8, the difference spectrum may be calculated by subtracting the first temperature correction spectrum from the second temperature correction spectrum. In this case, if the temperature of the light source is increased by ΔT, the difference spectrum may indicate a change in the spectrum of the sample.

Referring to FIG. 9, the processor 130 may extract, as a light source temperature drift vector, a principal component spectrum vector from the difference spectrum by using the aforementioned various dimension reduction algorithms. While FIG. 9 illustrates an example of extracting one principal component spectrum vector, this is merely an example, and the principal component spectrum vector is not limited thereto and the number of the principal component spectrum vectors is not specifically limited. The processor 130 may preprocess the difference spectrum by using various preprocessing methods such as multiplicative scatter correction (MSC), Standard normal variate (SNV), Orthogonal Signal Correction (OSC), Savitzky-Golay (SG), and the like.

Figure 10:
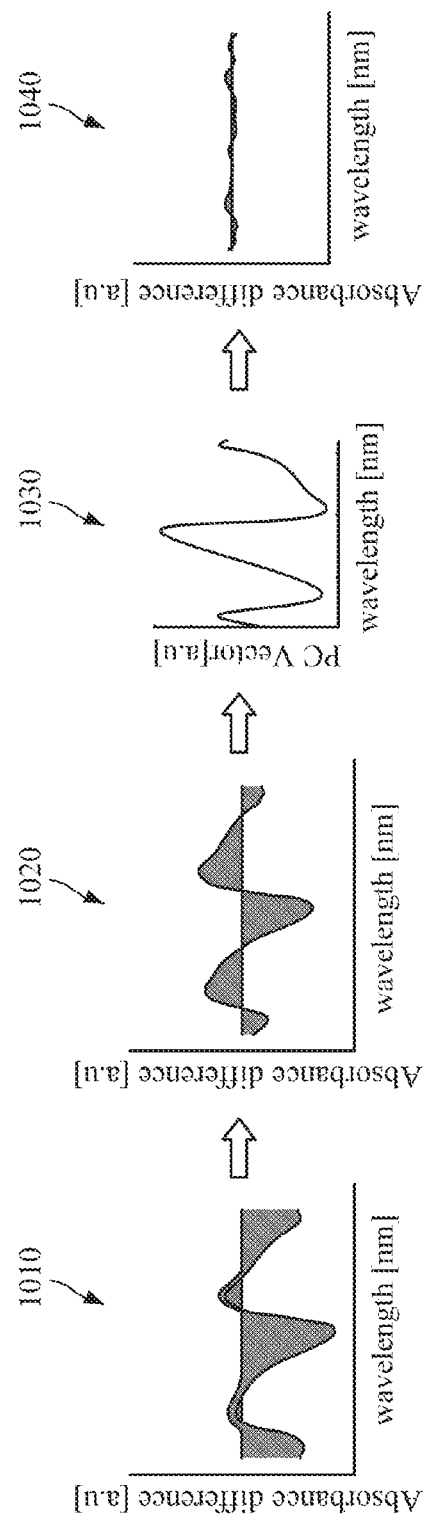
FIG. 10 is an exemplary diagram illustrating a result obtained by correcting an effect of a temperature change of a light source by using a method of correcting a temperature change of a light source according to an embodiment.

FIG. 10 is an exemplary diagram illustrating a result obtained by correcting an effect of a temperature change of a light source by using a method of correcting a temperature change of a light source according to an embodiment. In FIG. 10 reference numeral 1010 shows a difference spectrum which indicates a difference between an analysis spectrum and a preceding analysis spectrum when measuring a plurality of analysis spectra while maintaining a cooling delay at 500 μs; reference numeral 1020 shows a difference spectrum preprocessed by multiplicative scatter correction (MSC); reference numeral 1030 shows a light source temperature drift vector extracted from the preprocessed difference spectrum; and reference numeral 1040 shows a result obtained by removing the light source temperature drift vector component from the preprocessed difference spectrum.

As shown by reference numeral 1040 of FIG. 10, a biological spectrum having a high signal-to-noise ratio may be measured using the method of correcting a light source temperature change according to an embodiment.

Figure 11:
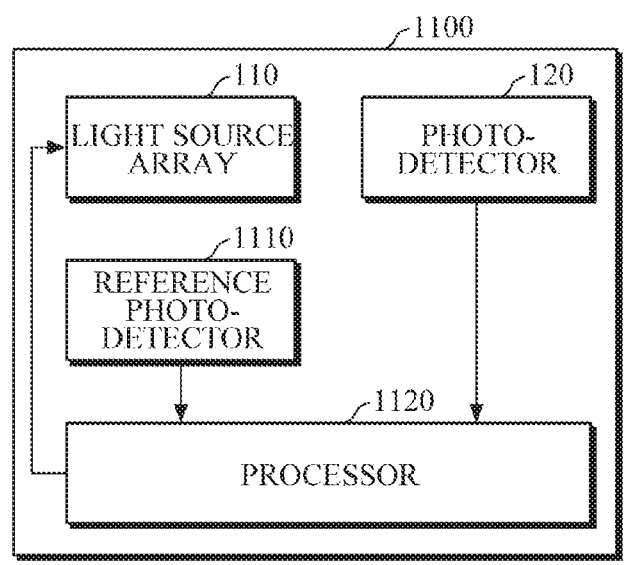
FIG. 11 is a diagram illustrating another example of an apparatus for measuring a spectrum according to an embodiment.

FIG. 11 is a diagram illustrating another example of an apparatus for measuring a spectrum. The spectrum measuring apparatus 1100 of FIG. 11 may be embedded in an electronic device, or may be enclosed in a housing to be provided as a separate device.

Referring to FIG. 11, the spectrum measuring apparatus 1100 includes the light source array 110, the photodetector 120, a reference photodetector 1110, and a processor 1120. Here, the light source array 110 and the photodetector 120 may be substantially similar to the light source array 110 and the photodetector 120 described above with reference to FIG. 1, and redundant description thereof may be omitted. Further, the processor 1120 performs a function similar to that of the processor 130 of FIG. 1, such that detailed description of redundant functionality may be omitted.

The reference photodetector 1110 may receive a light signal which is emitted by the light source array 110. The reference photodetector 1110 may convert the received light signal into an electrical signal, and may transmit the electrical signal to the processor 1120. In an embodiment, the reference photodetector 1110 may include a photo diode (PD), a photo transistor (PTr), a charge-coupled device (CCD), and the like. The reference photodetector 1110 may be a single device, or may be formed as an array of a plurality of devices.

The processor 1120 may determine whether a driving condition change is effectively applied based on an intensity of the light signal received by the reference photodetector 1110.

As illustrated in FIG. 6, the intensity of the light signal received by the reference photodetector 110 may be repeatedly increased or decreased based on a driving condition change. Accordingly, in an embodiment, if an increment or a decrement of an intensity of the light signal, compared to a preceding value of the reference photodetector 1110, is greater than or equal to a predetermined threshold value, then the processor 1120 may determine that the driving condition change is effectively applied. Alternatively, if an increment or a decrement of an intensity of the light signal, compared to a preceding value of the reference photodetector 1110, is less than a predetermined threshold value, then the processor 1120 may determine that the driving condition change is not effectively applied.

The processor 1120 may use a temperature correction spectrum, measured in the case where the driving condition change is effectively applied, in obtaining a light source temperature drift vector, and may discard a temperature correction spectrum measured in the case where the driving condition change is not effectively applied.

In this manner, the accuracy of obtaining the light source temperature drift vector may be improved.

Figure 12:
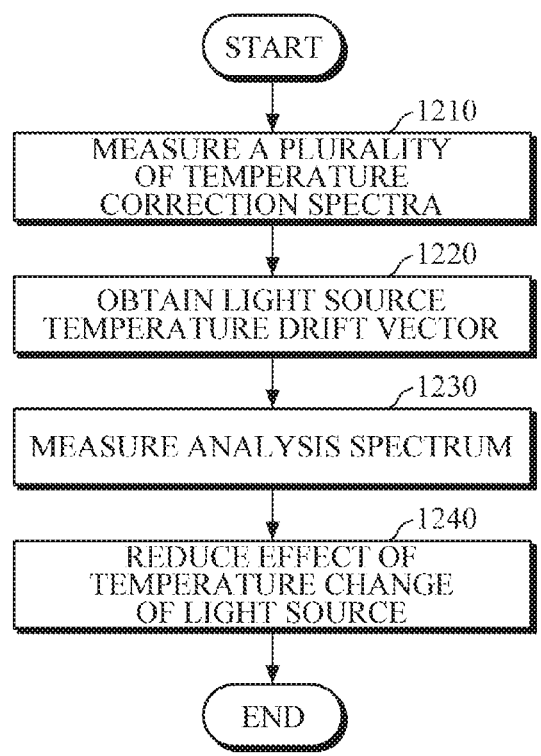
FIG. 12 is a diagram illustrating an example of a method of correcting a temperature change of a light source in a spectrum according to an embodiment.

FIG. 12 is a diagram illustrating an example of a method of correcting a temperature change of a light source in a spectrum according to an embodiment. The method of correcting a light source temperature change of FIG. 12 may be performed by the spectrum measuring apparatuses 100 and 1100 of FIGS. 1 and 11, respectively.

Referring to FIG. 12, the spectrum measuring apparatus may measure a plurality of temperature correction spectra according to a temperature change of each light source in operation 1210.

In an embodiment, the spectrum measuring apparatus may measure the plurality of temperature correction spectra by measuring in vivo spectra of an object based on changing driving conditions of a light source array. In this case, the driving conditions to be changed may include at least one of an intensity of an applied current, a pulse width, and a cooling delay. For example, the spectrum measuring apparatus may measure a first temperature correction spectrum by driving the light source array based on a first driving condition; and may induce a temperature change of the light source array by changing the first driving condition to a second driving condition, and may measure a second temperature correction spectrum by driving the light source array based on the second driving condition. Further, the spectrum measuring apparatus may measure a plurality of first temperature correction spectra and a plurality of second temperature correction spectra by repeatedly changing the driving conditions during a predetermined period of time. In this case, the predetermined period of time may be 20 seconds, but this is merely an example, and the predetermined period of time is not limited thereto and may be set to various values.

The spectrum measuring apparatus may obtain a light source temperature drift vector by analyzing the measured plurality of temperature correction spectra in operation 1220. In an embodiment, the spectrum measuring apparatus may calculate a difference spectrum between the first temperature correction spectrum, measured based on the first driving condition, and the second temperature correction spectrum measured based on the second driving condition; and may extract a principal component spectrum vector of the calculated difference spectrum as the light source temperature drift vector. In this case, the spectrum measuring apparatus may extract the principal component spectrum vector from the difference spectrum by using various dimension reduction algorithms. Further, in an embodiment, before extracting the light source temperature drift vector, the spectrum measuring apparatus may preprocess the difference spectrum by using various preprocessing methods as described above.

The spectrum measuring apparatus may measure an analysis spectrum in operation 1230.

The spectrum measuring apparatus may reduce (e.g., eliminate, mitigate, lessen, prevent, etc.) the effect of the temperature change of the light source array from the analysis spectrum by using the obtained light source temperature drift vector in operation 1240. For example, the spectrum measuring apparatus obtain a light source temperature drift vector component from the analysis spectrum by regression analysis, and may reduce the effect of the temperature change of the light source array from the analysis spectrum by removing the obtained light source temperature drift vector component from the analysis spectrum.

In an embodiment, before reducing the effect of the temperature change of the light source array, the spectrum measuring apparatus may correct a slope and an offset in the analysis spectrum. For example, the spectrum measuring apparatus may correct the slope and the offset in the analysis spectrum by MIN-MAX normalization, multiplicative scatter correction (MSC), and the like.

Further, in an embodiment, the spectrum measuring apparatus may receive a light signal emitted by the light source array, and may determine whether a driving condition change is effectively applied based on an intensity of the received light signal. For example, if an increment or a decrement of an intensity of the light signal, compared to a preceding value of the reference photodetector, is greater than or equal to a predetermined threshold value, then the spectrum measuring apparatus may determine that the driving condition change is effectively applied. Alternatively, if an increment or a decrement of an intensity of the light signal, compared to a preceding value of the reference photodetector, is less than a predetermined threshold value, then the spectrum measuring apparatus may determine that the driving condition change is not effectively applied. Further, the spectrum measuring apparatus may use a temperature correction spectrum, measured in the case where the driving condition change is effectively applied, in obtaining a light source temperature drift vector, and may discard a temperature correction spectrum measured in the case where the driving condition change is not effectively applied.

Moreover, in an embodiment, based on a predetermined period of time elapsing after obtaining the light source temperature drift vector, the spectrum measuring apparatus may re-measure a plurality of temperature correction spectra, and may re-obtain a light source temperature drift vector based on the re-measured plurality of temperature correction spectra. That is, by periodically updating the light source temperature drift vector, the spectrum measuring apparatus may properly reflect a change in optical characteristics (e.g., scattering coefficient) of an object.

Figure 13:
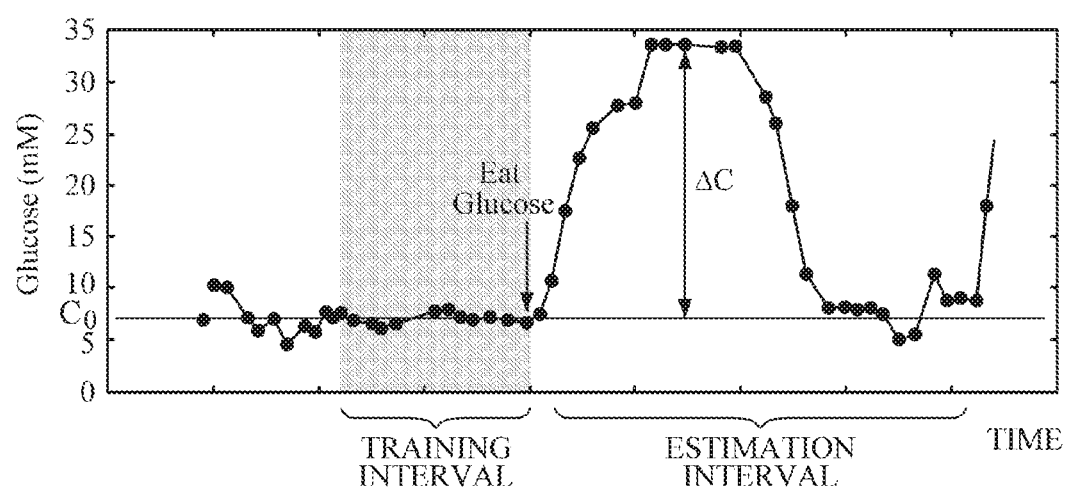
FIGS. 13 and 14 are diagrams explaining a concept of a Net Analyte Signal (NAS) algorithm according to an embodiment.
Figure 14:
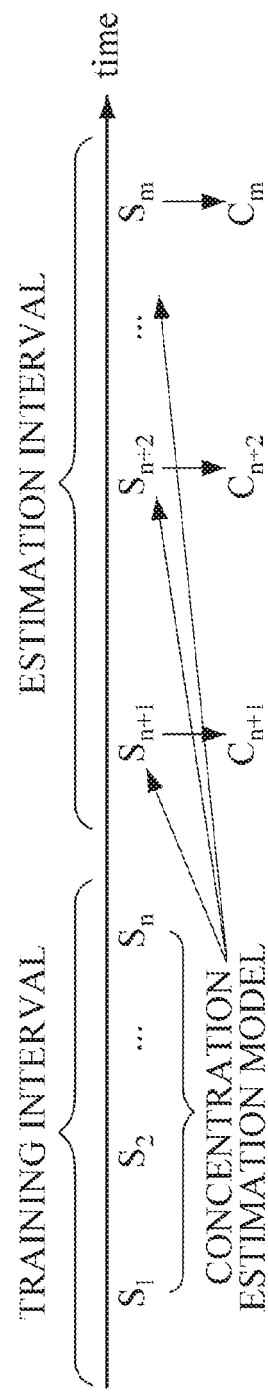

FIGS. 13 and 14 are diagrams explaining a concept of a Net Analyte Signal (NAS) algorithm according to an embodiment.

Referring to FIGS. 13 and 14, the Net Analyte Signal (NAS) algorithm may generate an analyte concentration estimation model by identifying a spectrum change factor, which is relatively less relevant to a change in an analyte concentration, using in vivo spectra $S_1, S_2, \ldots,$ and $S_n$ measured during a training interval as training data. Further, the NAS algorithm may estimate analyte concentrations $C_{n+1}, C_{n+2}$ and $C_m$ by using in vivo spectra $S_{n+1}, S_{n+2}, \ldots,$ and $S_m$ measured during an estimation interval following the training interval, and the concentration estimation model generated using training data corresponding to the training interval. In this case, the training interval may be an interval (e.g., a fating interval if an analyte is glucose) in which the concentration of an in vivo analyte is substantially constant. As used herein, a concentration of an in vivo analyte being "substantially constant" may refer to a change in the concentration of the in vivo analyte being less than a predetermined threshold. As an example, and referring to FIG. 1, the glucose concentration may be substantially constant in the training interval because a change in the concentration is not greater than substantially five millimolar (mM). It should be understood that a threshold change value for "substantially constant" may vary depending on the underlying value that remains "substantially constant."

That is, the NAS algorithm may generate a concentration estimation model based on the in vivo spectra measured during the training interval, and then may estimate an analyte concentration by applying the generated concentration estimation model to the in vivo spectra measuring during the estimation interval.

Figure 15:
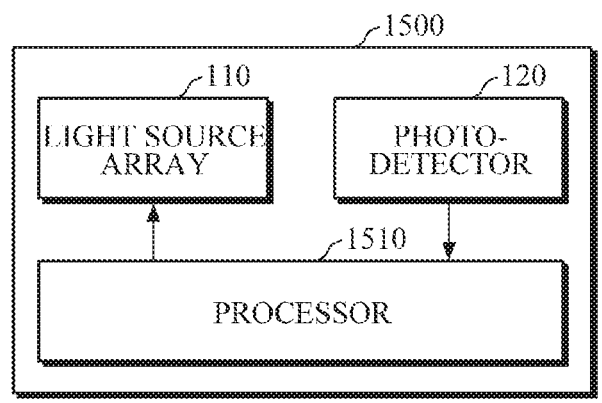
FIG. 15 is a block diagram illustrating an example of an apparatus for estimating a concentration of an analyte according to an embodiment.

FIG. 15 is a block diagram illustrating an example of an apparatus for estimating a concentration of an analyte according embodiment. The concentration estimating apparatus 1500 of FIG. 15 is an apparatus for estimating an analyte concentration by analyzing an in vivo spectrum of an object, and may be embedded in an electronic device or may be enclosed in a housing to be provided as a separate device.

Referring to FIG. 15, the concentration estimating apparatus 1500 includes the light source array 110, the photodetector 120, and a processor 1510. Here, the light source array 110 and the photodetector 120 may be substantially similar to the light source array 110 and the photodetector 120 described above with reference to FIG. 1, such that redundant description thereof may be omitted.

The processor 1510 may control the overall operation of the concentration estimating apparatus 1500.

By using the light source array 110 and the photodetector 120, the processor 1510 may measure a plurality of in vivo spectra during an interval in which an analyte concentration of an object is substantially constant (hereinafter referred to as "training spectra").

The processor 1510 may generate a concentration estimation model based on the measured plurality of training spectra. In this case, examples of the analyte may include glucose, triglyceride, urea, uric acid, lactate, protein, cholesterol, ethanol, and the like, but the analyte is not limited thereto. In the case where an in vivo analyte is glucose, an analyte concentration may indicate blood glucose level; and an interval in which an analyte is substantially constant may be a fasting interval in which glucose is not consumed by the object. Hereinafter, for convenience of explanation, the following description will be given using glucose as an example of an analyte.

In an embodiment, the processor 1510 may generate a concentration estimation model by using the NAS algorithm and the plurality of training spectra measured during the empty-stomach interval. More specifically, the processor 1510 may identify a spectrum change factor, which is relatively less relevant to a change in the analyte concentration, by using the plurality of training spectra measured during the empty-stomach interval as training data. For example, the processor 1510 may extract a principal component spectrum vector from the plurality of training spectra, measured during the empty-stomach interval, by using various dimension reduction algorithms such as Principal Component Analysis (PCA), Independent Component Analysis (ICA), Non-negative Matrix Factorization (NMF), Singular Value Decomposition (SVD), and the like. In addition, the processor 1510 may generate the concentration estimation model based on a result of the training, i.e., the extracted principal component spectrum vector. In this case, the generated concentration estimation model may be represented by the following Equations 2 and 3 shown below.

$$S_m = \sum_i a_i \times S_{pc,i} + \varepsilon_g \times L \times \Delta C \qquad \text{[Equation 2]}$$

$$C_m = \Delta C + C_0 \qquad \text{[Equation 3]}$$

Referring to Equations 2 and 3 above, $C_m$ denotes the analyte concentration, $C_0$ denotes a reference analyte concentration (e.g., analyte concentration measured during the fasting interval), $\Delta C$ denotes a variation in concentration compared to $C_0$, $S_m$ denotes an analysis spectrum vector, $S_{pc,i}$ denotes the principal component spectrum vector, $a_i$ denotes a contribution of each principal component spectrum vector to the in vivo spectrum vector for estimation, $\varepsilon_g$ denotes a spectrum vector of an analyte per unit concentration e.g., 1 mM) (hereinafter referred to as a pure component spectrum vector), and L denotes a light path length, in which $\varepsilon_g$ may be obtained experimentally.

By using the light source array 110 and the photodetector 120, the processor 1510 may measure a plurality of temperature correction spectra based on a temperature change of each light source of the light source array 110. Further, the processor 1510 may measure an analysis spectrum for analysis to estimate the analyte concentration of the object.

The processor 1510 may induce a temperature change of each light source of the light source array 110 by changing driving conditions of the light source array 110. In this case, the driving conditions to be changed may include at least one of an intensity of an applied current, a pulse width, and a cooling delay. Further, the processor 1510 may measure a plurality of temperature correction spectra by measuring the in vivo spectra of the object based on changing the driving conditions of the light source array 110. In an embodiment, the processor 1510 may measure a first temperature correction spectrum by driving the light source array 110 based on a first driving condition; and may induce a temperature change of the light source array 110 by changing the first driving condition to a second driving condition, and may measure a second temperature correction spectrum by driving the light source array 110 based on the second driving condition. Further, the processor 1510 may measure a plurality of first temperature correction spectra and a plurality of second temperature correction spectra by repeatedly changing the driving conditions during a predetermined period of time. In this case, the predetermined period of time may be 20 seconds, but this is merely an example, and the predetermined period of time t limited thereto and may be set to various values.

The processor 1510 may obtain a light source temperature drift vector by analyzing the measured plurality of temperature correction spectra. In an embodiment, the processor 1510 may calculate a difference spectrum between the first temperature correction spectrum, measured based on the first driving condition, and the second temperature correction spectrum measured based on the second driving condition; and may extract a principal component spectrum vector of the calculated difference spectrum as the light source temperature drift vector. In this case, the processor 1510 may extract the principal component spectrum vector from the difference spectrum by using various dimension reduction algorithms described above. Further, in an embodiment, the processor 1510 may preprocess the difference spectrum by using the aforementioned various dimension reduction algorithms.

The processor 1510 may update the concentration estimation model by using the obtained light source temperature drift vector. For example, the processor 1510 may update Equation 2 to Equation 4.

$$S_m = \sum_i a_i \times S_{pc,i} + \varepsilon_g \times L \times \Delta C + a_{LED} \times S_{LED} \qquad \text{[Equation 4]}$$

Referring to Equation 4 shown above, $S_{LED}$ denotes the light source temperature drift vector and $a_{LED}$ denotes the contribution of $S_{LED}$ to the in vivo spectrum vector for estimation.

Based on updating the concentration estimation model and obtaining the analysis spectrum for estimating the analyte concentration, the processor 1510 may estimate the analyte concentration by using the analysis spectrum and the updated concentration estimation model. For example, the processor 1510 may calculate ΔC by applying a regression analysis algorithm (e.g., least square method) to Equation 4, and may estimate the analyte concentration using Equation 3 shown elsewhere herein. In the process of calculating ΔC by applying the regression analysis algorithm, $a_i$ and $a_{LED}$ may also be calculated.

Based on a predetermined period of time elapsing after updating the concentration estimation model, the processor 1510 may re-update the updated concentration estimation model by re-measuring a plurality of temperature correction spectra, and re-obtaining a light source temperature drift vector based on the re-measured plurality of temperature correction spectra. That is, by periodically updating the light source drift vector, the processor 1510 may properly reflect a change in optical characteristics (e.g., scattering coefficient) of an object.

Figure 16:
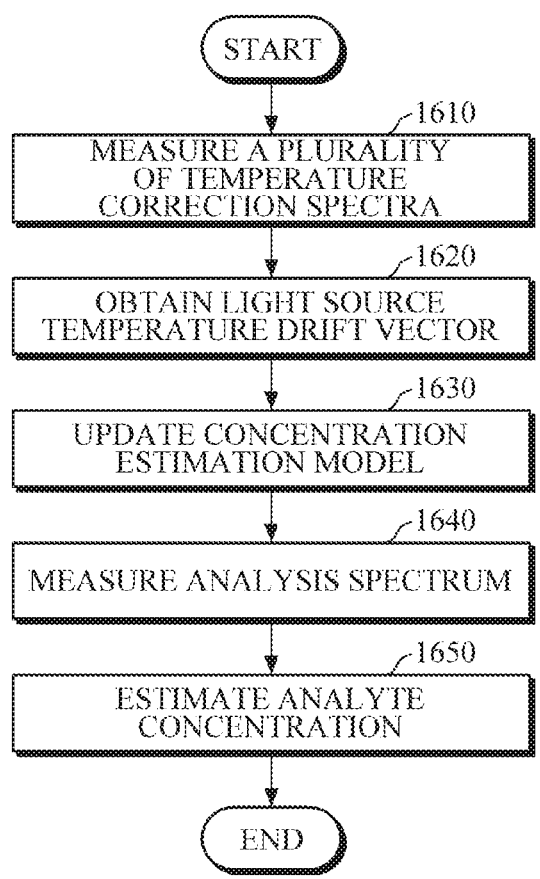
FIG. 16 is a diagram illustrating an example of a method of estimating a concentration of an analyte according to an embodiment.

FIG. 16 is a diagram illustrating an example of a method of estimating a concentration of an analyte according to an embodiment. The concentration estimating method of FIG. 16 may be performed by the concentration estimating apparatus 1500 of FIG. 15.

Referring to FIG. 16, the concentration estimating apparatus may measure a plurality of temperature correction spectra according to a temperature change of each light source in operation 1610.

In an embodiment, the concentration estimating apparatus may measure the plurality of temperature correction spectra by measuring the in vivo spectra of an object based on changing driving conditions of the light source array. In this case, the driving conditions to be changed may include at least one of an intensity of an applied current, a pulse width, and a cooling delay. For example, the concentration estimating apparatus may measure a first temperature correction spectrum by driving the light source array based on a first driving condition; and may induce a temperature change of the light source array by changing the first driving condition to a second driving condition, and may measure a second temperature correction spectrum by driving the light source array based on the second driving condition. Further, the concentration estimating apparatus may measure a plurality of first temperature correction spectra and a plurality of second temperature correction spectra by repeatedly changing the driving conditions during a predetermined period of time. In this case, the predetermined period of time may be 20 seconds, but this is merely an example, and the predetermined period of time is not limited thereto and may be set to various values.

The concentration estimating apparatus may obtain a light source temperature drift vector by analyzing the measured plurality of temperature correction spectra in operation 1620. In an embodiment, the concentration estimating apparatus may calculate a difference spectrum between the first temperature correction spectrum, measured based on the first driving condition, and the second temperature correction spectrum measured based on the second driving condition; and may extract a principal component spectrum vector of the calculated difference spectrum as the light source temperature drift vector. In this case, the concentration estimating apparatus may extract the principal component spectrum vector from the difference spectrum by using various dimension reduction algorithms described above. Further, in an embodiment, before extracting the light source temperature drift vector, the concentration estimating apparatus may preprocess the difference spectrum by using one or more of the aforementioned various dimension reduction algorithms.

The concentration estimating apparatus may update the concentration estimation model by using the obtained light source temperature drift vector in operation 1630. For example, the concentration estimating apparatus may update Equation 2 to Equation 4 as shown elsewhere herein.

The concentration estimating apparatus may measure an analysis spectrum in operation 1640.

The concentration estimating apparatus may estimate an analyte concentration by using the analysis spectrum and the updated concentration estimation model in operation 1650. For example, the concentration estimating apparatus may calculate ΔC by applying a regression analysis algorithm (e.g., a least square method) to Equation 4 as shown elsewhere herein, and may estimate the analyte concentration using Equation 3 shown elsewhere herein. In the process of calculating ΔC by applying the regression analysis algorithm, $a_i$ and $a_{LED}$ may also be calculated.

Figure 17:
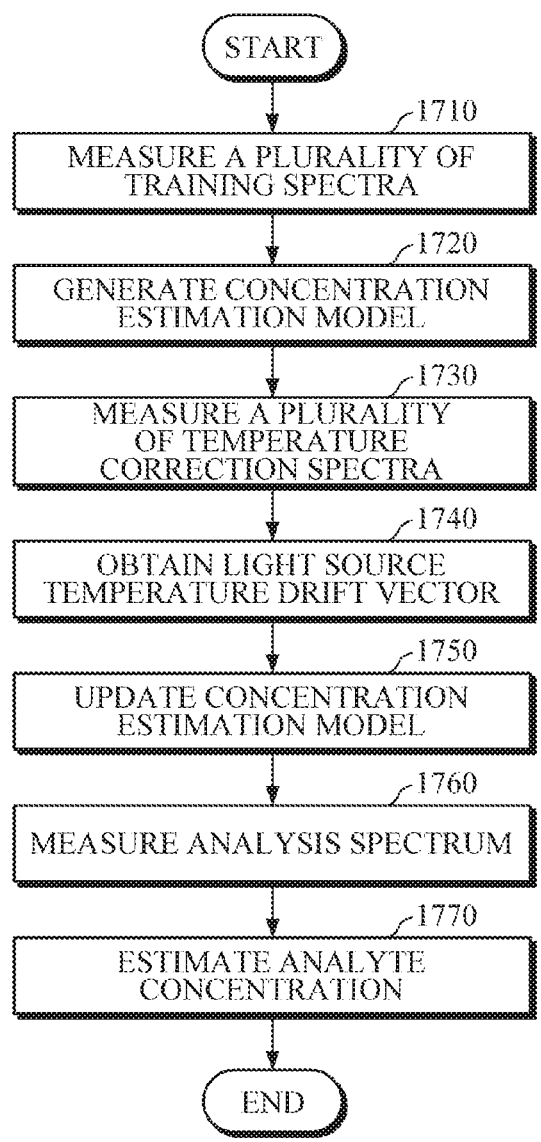
FIG. 17 is a diagram illustrating another example of a method of estimating a concentration of an analyte according to an embodiment.

FIG. 17 is a diagram illustrating another example of a method of estimating a concentration of an analyte according to an embodiment. The concentration estimating method of FIG. 17 may be performed by the concentration estimating apparatus 1500 of FIG. 15. Operations 1730 to 1770 of FIG. 17 may be substantially similar as the operations 1610 to 1650 of FIG. 16 respectively, such that the description thereof may be briefly made below.

Referring to FIG. 17, the concentration estimating apparatus may measure a plurality of training spectra during an interval in which an analyte concentration of an object is substantially constant in operation 1710.

The concentration estimating apparatus may generate a concentration estimation model based on the measured plurality of training spectra in operation 1720. In this case, examples of the analyte may include glucose, triglyceride, urea, uric acid, lactate, protein, cholesterol, ethanol, and the like, but the analyte is not limited thereto. In the case where an in vivo analyte is glucose, an analyte concentration may indicate a blood glucose level; and an interval in which an analyte is substantially constant may indicate a fasting interval in which glucose is not consumed by an object.

In an embodiment, the concentration estimating apparatus may generate a concentration estimation model by using the NAS algorithm and the plurality of training spectra. More specifically, the concentration estimating apparatus may identify a spectrum change factor, which is relatively less relevant to a change in the analyte concentration, by using the plurality of training spectra as training data. For example, the concentration estimating apparatus may extract a principal component spectrum vector from the plurality of training spectra by using various dimension reduction algorithms described above. In addition, the concentration estimating apparatus may generate the concentration estimation model based on a result of the training, i.e., the extracted principal component spectrum vector. In this case, the generated concentration estimation model may be represented by the Equations 2 and 3 shown elsewhere herein.

The concentration estimating apparatus may measure a plurality of temperature correction spectra based on a temperature change of each light source in operation 1730, and may obtain a light source temperature drift vector by analyzing the measured plurality of temperature correction spectra in operation 1740.

The concentration estimating apparatus may update the concentration estimation model by using the obtained light source temperature drift vector in operation 1750, and may measure an analysis spectrum in operation 1760.

The concentration estimating apparatus may estimate an analyte concentration by using the analysis spectrum and the updated concentration estimation model in operation 1770.

Figure 18:
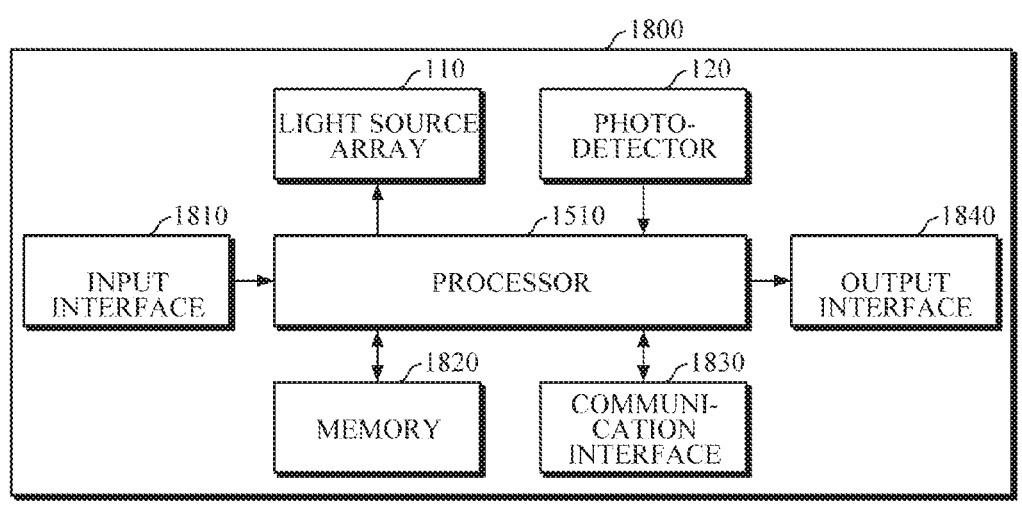
FIG. 18 is a block diagram illustrating another example of an apparatus for estimating a concentration of an analyte according to an embodiment.

FIG. 18 is a block diagram illustrating another example of an apparatus for estimating a concentration of an analyte according to an embodiment. The concentration estimating apparatus 1800 of FIG. 18 is an apparatus for estimating an analyte concentration by analyzing an in vivo spectrum of an object, and may be embedded in an electronic device, or may be enclosed in a housing to be provided as a separate device.

Referring to FIG. 18, the concentration estimating apparatus 1800 includes the light source array 110, the photodetector 120, the processor 1510, an input interface 1810, a memory 1820, a communication interface 1830, and an output interface 1840. Here, the light source array 110, the photodetector 120, and the processor 1510 may be substantially sit described above with reference to FIG. 15, such that detailed description thereof may be omitted.

The input interface 1810 may receive input of various operation signals based on a user input. In an embodiment, the input interface 1810 may include a keypad, a dome switch, a touch pad (static pressure/capacitance), a jog wheel, a jog switch, a hardware (H/W) button, and the like. Particularly, the touch pad, which forms a layer structure with a display, may be referred to as a touch screen.

The memory 1820 may store programs or commands for operation of the concentration estimating apparatus 1800, and may store data input to and output from the concentration estimating apparatus 1800. Further, the memory 1820 may store an in vivo spectrum, a concentration estimation model, an estimated analyte concentration value, and the like. The memory 1820 may include at least one storage medium of a flash memory type memory, a hard disk type memory, a multimedia card micro type memory, a card type memory (e.g., a secure digital (SD) memory, an eXtreme digital (XD) memory, etc.), a Random Access Memory (RAM), a Static Random Access Memory (SRAM), a Read Only Memory (ROM), an Electrically Erasable Programmable Read Only Memory (EEPROM), a Programmable Read Only Memory (PROM), a magnetic memory, a magnetic disk, and an optical disk, and the like. Further, the concentration estimating apparatus 1800 may communicate with an external storage medium, such as web storage and the like, which performs a storage function of the memory 1820 via the Internet.

The communication interface 1830 may perform communication with an external device. For example, the communication interface 1830 may transmit, to the external device, the data input be concentration estimating apparatus 1800, data stored in and processed by the concentration estimating apparatus 1800, and the like, or may receive, from the external device, various data for generating/updating a concentration estimation model and estimating an analyte concentration.

In this case, the external device may be medical equipment that uses the data input to the concentration estimating apparatus 1800, the data stored in and processed by the concentration estimating apparatus 1800, and the like, a printer to print out results, or a display to display the results. In addition, the external device may be a digital television (TV), a desktop computer, a cellular phone, a smartphone, a tablet PC, a laptop computer, a personal digital assistant (PDA), a portable multimedia player (PMP), a navigation, an MP3 player, a digital camera, a wearable device, and the like, but is not limited thereto.

The communication interface 1830 may communicate with an external device by using Bluetooth communication, Bluetooth Low Energy (BLE) communication, Near Field Communication (NFC), wireless local area network (WLAN) communication, Zigbee communication, Infrared Data Association (IrDA) communication, wireless fidelity (Wi-Fi) communication, Ultra-Wideband (UWB) communication, Ant+ communication, Wi-Fi Direct (WFD) communication, Radio Frequency Identification (RFID) communication, third generation (3G) communication, fourth generation (4G) communication, fifth generation (5G) communication, and the like. However, this is merely exemplary and is not intended to be limiting.

The output interface 1840 may output the data input to the concentration estimating apparatus 1800, the data stored in and processed by the concentration estimating apparatus 1800, and the like. In an embodiment, the output interface 1840 may output the data input to the concentration estimating apparatus 1800, the data stored in and processed by the concentration estimating apparatus 1800, and the like, by using at least one of an acoustic method, a visual method, and a tactile method. To this end, the output interface 1840 may include a speaker, a display, a vibrator, and the like.

Figure 19:
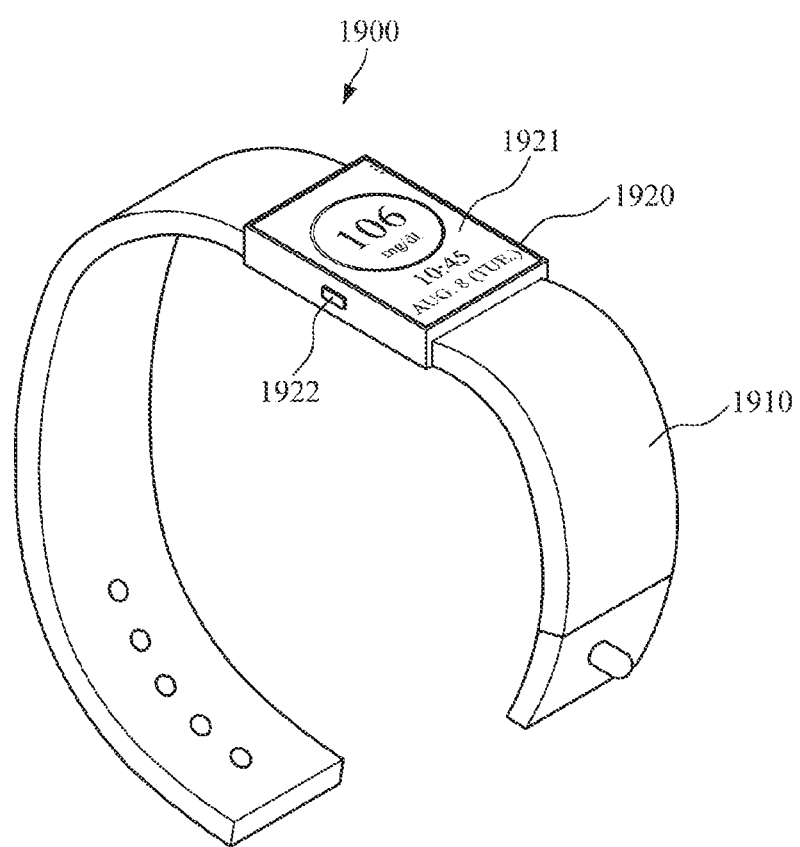
FIG. 19 is a diagram illustrating an example of a wrist-type wearable device according to an embodiment.

FIG. 19 is a diagram illustrating an example of a wrist-type wearable device according to an embodiment.

Referring to FIG. 19, the wrist-type wearable device 1900 includes a strap 1910 and a main body 1920.

The strap 1910 may be connected to both ends of the main body 1920 so as to be fastened in a detachable manner or may be integrally formed therewith as a smart band. The strap 1910 may be made of a flexible material to be wrapped around a user's wrist so that the main body 1920 may be worn on the wrist.

The main body 1920 may include the aforementioned spectrum measuring apparatuses 100 and 1100 and/or the aforementioned concentration estimating apparatuses 1500 and 1800. Further, the main body 1920 may include a battery which supplies power to the spectrum measuring apparatuses 100 and 1100, the concentration estimating apparatuses 1500 and 1800, and/or the wrist-type wearable device 1900.

An optical sensor may be disposed at the bottom of the main body 1920 to be exposed to a user's wrist. Accordingly, when a user wears the wrist-type wearable device 1900, the optical sensor may naturally come into contact with the user's skin. In this case, the optical sensor may obtain an in vivo spectrum by emitting light towards the user's wrist and receiving light reflected by or scattered by the user's wrist.

The wrist-type wearable device 1900 may further include a display 1921 and an input interface 1922 which are disposed in the main body 1920. The display 1921 may display data processed by the spectrum measuring apparatuses 100 and 1100, the concentration estimating apparatuses 1500 and 1800, and/or the wrist-type wearable device 1900, processing result data thereof, and the like. The input interface 1922 may receive various operation signals from a user based on a user input.

The present disclosure can be realized as computer-readable code stored in a non-transitory computer-readable recording medium. The computer-readable medium may be any type of recording device in which data is stored in a computer-readable manner. Examples of the computer-readable medium include a ROM, a RAM, a CD-ROM, a magnetic tape, a floppy disc, an optical data storage, and a carrier wave (e.g., data transmission through the Internet). The computer-readable medium may be distributed via a plurality of computer systems connected to a network so that computer-readable code is written thereto and executed therefrom in a decentralized manner.

The present disclosure has been described herein with regard to preferred embodiments. However, it should be apparent to those skilled in the art that various changes and modifications can be made without changing technical ideas and of the present disclosure. Thus, it is clear that the above-described embodiments are illustrative in all aspects and are not intended to limit the present disclosure.

What is claimed is:

1. An apparatus for measuring a spectrum, the apparatus comprising:
a light source array configured to emit light towards an object;
a photodetector configured to detect light reflected by the object; and
a processor configured to:
measure a first temperature correction spectrum by driving the light source array based on a first driving condition;
induce a temperature change of the light source array by changing the first driving condition to a second driving condition;
measure a second temperature correction spectrum by driving the light source array based on the second driving condition;
obtain a light source temperature drift vector by analyzing the first temperature correction spectrum and the second temperature correction spectrum;
measure, using the light source array and the photodetector, an analysis spectrum by using the light source array and the photodetector; and
adjust the measured analysis spectrum to reduce an effect of the temperature change of the light source array by using the obtained light source temperature drift vector.

2. The apparatus of claim 1, wherein the processor is configured to:
obtain a light source temperature drift vector component from the measured analysis spectrum by regression analysis using the obtained light source temperature drift vector; and
remove the obtained light source temperature drift vector component from the measured analysis spectrum.

3. The apparatus of claim 1, wherein the processor is configured to:
correct a slope and an offset in the measured analysis spectrum.

4. The apparatus of claim 1, wherein the first temperature correction spectrum, the second temperature correction spectrum, and the analysis spectrum are absorption spectra.

5. The apparatus of claim 1, wherein the processor is configured to:
induce the temperature change of the light source array by changing at least one of a pulse width, a cooling delay, and an intensity of an applied current.

6. The apparatus of claim 1, wherein the processor is configured to:
calculate a difference spectrum between the first temperature correction spectrum and the second temperature correction spectrum; and
extract a principal component spectrum vector of the calculated difference spectrum as the light source temperature drift vector.

7. The apparatus of claim 6, wherein the processor is configured to:
extract the principal component spectrum vector by using one of Principal Component Analysis (PCA), Independent Component Analysis (ICA), Non-negative Matrix Factorization (NMF), and Singular Value Decomposition (SVD).

8. The apparatus of claim 1, further comprising:
a reference photodetector configured to detect light emitted by the light source array.

9. The apparatus of claim 8, wherein the processor is configured to:
determine whether a driving condition change is effectively applied based on an intensity of the light detected by the reference photodetector.

10. A method of correcting a temperature change of a light source in a spectrum, the method comprising:
measuring a first temperature correction spectrum by driving the light source based on a first driving condition;
inducing a temperature change of the light source by changing the first driving condition to a second driving condition;
measuring a second temperature correction spectrum by driving the light source based on the second driving condition;
obtaining a light source temperature drift vector by analyzing the first temperature correction spectrum and the second temperature correction spectrum;
measuring an analysis spectrum of the object; and
adjusting the measured analysis spectrum to reduce an effect of the temperature change of the light source by using the obtained light source temperature drift vector.

11. The method of claim 10, wherein the adjusting of the measured analysis spectrum to reduce the effect of the temperature change of the light source comprises:
obtaining a light source temperature drift vector component from the measured analysis spectrum by regression analysis using the obtained light source temperature drift vector; and
removing the obtained light source temperature drift vector component from the analysis spectrum.

12. The method of claim 10, further comprising:
correcting a slope and an offset in the measured analysis spectrum.

13. The method of claim 10, wherein the first temperature correction spectrum, the second temperature correction spectrum, and the analysis spectrum are absorption spectra.

14. The method of claim 10, wherein the inducing of the temperature change of the light source comprises inducing the temperature change of the light source by changing at least one of a pulse width, a cooling delay, and an intensity of an applied current.

15. The method of claim 10, wherein the obtaining of the light source temperature drift vector comprises:
calculating a difference spectrum between the first temperature correction spectrum and the second temperature correction spectrum; and
extracting a principal component spectrum vector of the calculated difference spectrum as the light source temperature drift vector.

16. The method of claim 15, wherein the extracting of the principal component spectrum vector comprises extracting the principal component spectrum vector by using one of Principal Component Analysis (PCA), Independent Component Analysis (ICA), Non-negative Matrix Factorization (NMF), and Singular Value Decomposition (SVD).

17. The method of claim 10, further comprising:
receiving a light signal emitted by the light source.

18. The method of claim 17, further comprising:
determining whether a driving condition change is effectively applied based on an intensity of the light signal.

19. An apparatus for estimating a concentration of an analyte, the apparatus comprising:
a light source array configured to emit light towards an object;
a photodetector configured to detect light reflected by the object; and
a processor configured to:
measure, using the light source array and the photodetector, a plurality of temperature correction spectra based on a temperature change of the light source array;
obtain a light source temperature drift vector by analyzing the measured plurality of temperature correction spectra;
update a concentration estimation model by using the obtained light source temperature drift vector;
measure, using the light source array and the photodetector, an analysis spectrum; and
estimate the concentration of the analyte by using the updated concentration estimation model and the measured analysis spectrum.

20. The apparatus of claim 19, wherein the processor is configured to:
measure a first temperature correction spectrum by driving the light source array based on a first driving condition;
induce a temperature change of the light source array by changing the first driving condition to a second driving condition; and
measure a second temperature correction spectrum by driving the light source array based on the second driving condition.

21. The apparatus of claim 20, wherein the processor is configured to:
induce the temperature change of the light source array by changing at least one of a pulse width, a cooling delay, and an intensity of an applied current.

22. The apparatus of claim 20, wherein the processor is configured to:
calculate a difference spectrum between the first temperature correction spectrum and the second temperature correction spectrum; and
extract a principal component spectrum vector of the calculated difference spectrum as the light source temperature drift vector.

23. The apparatus of claim 22, wherein the processor is configured to:
extract the principal component spectrum vector by using one of Principal Component Analysis (PCA), Independent Component Analysis (ICA), Non-negative Matrix Factorization (NMF), and Singular Value Decomposition (SVD).

24. The apparatus of claim 19, wherein the analyte is at least one of glucose, triglyceride, urea, uric acid, lactate, protein, cholesterol, or ethanol.

25. The apparatus of claim 19, wherein the concentration estimation model is generated using a Net Analyte Signal (NAS) algorithm.

26. The apparatus of claim 19, wherein the processor is configured to:
measure a plurality of training spectra in a predetermined interval by using the light source array and the photodetector; and
generate the concentration estimation model based on the measured plurality of training spectra.

27. The apparatus of claim 26, wherein the processor is configured to:
extract a principal component spectrum vector from the measured plurality of training spectra; and
generate the concentration estimation model based on the extracted principal component spectrum vector and a pure component spectrum vector of the analyte.

28. The apparatus of claim 26, wherein the predetermined interval is an interval in which the concentration of the analyte of the object is substantially constant.

29. The apparatus of claim 28, wherein:
the analyte is glucose; and
the interval, in which the concentration of the analyte of the object is substantially constant, is a fasting interval.

30. A method of estimating a concentration of an analyte, the method comprising:
measuring a plurality of temperature correction spectra of an object based on a temperature change of a light source;
obtaining a light source temperature drift vector by analyzing the measured plurality of temperature correction spectra;
updating a concentration estimation model by using the obtained light source temperature drift vector;
measuring an analysis spectrum of the object; and
estimating the concentration of the analyte by using the updated concentration estimation model and the measured analysis spectrum.

31. The method of claim 30, wherein the measuring of the plurality of temperature correction spectra comprises:
measuring a first temperature correction spectrum by driving the light source based on a first driving condition;
inducing a temperature change of the light source by changing the first driving condition to a second driving condition; and
measuring a second temperature correction spectrum by driving the light source based on the second driving condition.

32. The method of claim 31, wherein the inducing of the temperature change of the light source comprises inducing the temperature change of the light source by changing at least one of a pulse width, a cooling delay, and an intensity of an applied current.

33. The method of claim 31, wherein the obtaining of the light source temperature drift vector comprises:
calculating a difference spectrum between the first temperature correction spectrum and the second temperature correction spectrum; and
extracting a principal component spectrum vector of the calculated difference spectrum as the light source temperature drift vector.

34. The method of claim 33, wherein the extracting of the principal component spectrum vector comprises extracting the principal component spectrum vector by using one of Principal Component Analysis (PCA), Independent Component Analysis (ICA), Non-negative Matrix Factorization (NMF), and Singular Value Decomposition (SVD).

35. The method of claim 30, wherein the analyte is at least one of glucose, triglyceride, urea, uric acid, lactate, protein, cholesterol, or ethanol.

36. The method of claim 30, wherein the concentration estimation model is generated using a Net Analyte Signal (NAS) algorithm.

37. The method of claim 30, further comprising:
   measuring a plurality of training spectra in a predetermined interval by using the light source and a photodetector; and
   generating the concentration estimation model based on the measured plurality of training spectra.

38. The method of claim 37, wherein the generating of the concentration estimation model comprises:
   extracting a principal component spectrum vector from the measured plurality of training spectra; and
   generating the concentration estimation model based on the extracted principal component spectrum vector and a pure component spectrum vector of the analyte.

39. The method of claim 37, wherein the predetermined interval is an interval in which the concentration of the analyte of the object is substantially constant.

40. The method of claim 39, wherein:
   the analyte is glucose; and
   the interval, in which the concentration of the analyte of the object is substantially constant, is a fasting interval.

41. A wearable device comprising:
   a light source configured to emit light towards a wrist of a user;
   a photodetector configured to detect light reflected by the wrist of the user;
   a display configured to display a blood glucose level of the user; and
   a processor configured to:
      measure, using the light source and the photodetector, temperature correction spectra based on a temperature change of the light source;
      identify a light source temperature drift vector based on the temperature correction spectra;
      update a blood glucose level estimation model based on the light source temperature drift vector;
      measure, using the light source and the photodetector, an analysis spectrum;
      identify the blood glucose level of the user based on the analysis spectrum and the updated blood glucose level estimation model; and
      control the display to display the blood glucose level of the user.

* * * * *